United States Patent [19]

Bright et al.

[11] 4,262,329
[45] Apr. 14, 1981

[54] SECURITY SYSTEM FOR DATA PROCESSING

[75] Inventors: Herbert S. Bright, Bethesda, Md.; Richard L. Enison, San Pablo, Calif.

[73] Assignee: Computation Planning, Inc., Bethesda, Md.

[21] Appl. No.: 890,468

[22] Filed: Mar. 27, 1978

[51] Int. Cl.³ .................. G06F 11/00; H04L 9/00
[52] U.S. Cl. ................. 364/200; 340/347 DD
[58] Field of Search ..... 178/22; 340/149 A, 347 DD; 364/900 MS File, 200 MSFile

[56] References Cited

U.S. PATENT DOCUMENTS

| | | | |
|---|---|---|---|
| 3,796,830 | 3/1974 | Smith | 178/22 |
| 3,798,359 | 3/1974 | Feistel | 364/200 |
| 3,798,360 | 3/1974 | Feistel | 178/22 |
| 3,798,605 | 3/1974 | Feistel | 364/200 |
| 3,806,882 | 4/1974 | Clarke | 364/200 |
| 3,906,448 | 9/1975 | Henriques | 340/149 A |
| 3,931,504 | 1/1976 | Jacoby | 364/200 |
| 3,958,081 | 5/1976 | Ehrsaw | 364/200 |

OTHER PUBLICATIONS

Bisbey and Popeck, "Encapsulation: An Approach to Operating System Security" USC/Info. Sci. Inst. California, Oct. 73, pp. 666-675.
"Encryption Methods in Data Networks", Blom et al. Ericsson Technics No. 2, 1978, pp. 74-105.

Primary Examiner—Gareth D. Shaw
Assistant Examiner—E. Chan
Attorney, Agent, or Firm—Morton C. Jacobs

[57] ABSTRACT

A data processing security system employs a secure enclosure, such as a vault, for all cryptographic processes, and the maintenance of digital information in storage outside of the enclosure in encrypted form and when not in use by the host computer system, where the information is used in plain text form and which communicates with the enclosed encryption system by a standard interface.

12 Claims, 12 Drawing Figures

SECURITY SYSTEM FOR DATA PROCESSING

BACKGROUND OF THE INVENTION

This invention relates to a system for maintaining the security of information employed in electronic data processing.

During the past few years there has been rapidly growing interest in information security, not only for the safeguarding of fiduciary and other files having intrinsic value, but for improving access control over sensitive data, including personal information, while procedures are being upgraded to meet present and anticipated privacy requirements.

Vast amounts of money and high-grade talent have been expended in defining and developing more nearly secure systems. Those who have studied the problems thoroughly are among the least complacent about the adequacy of their solutions. Systems once thought highly secure are now viewed as readily penetrable.

One basic tool that is clearly definable and broadly applicable is the encryption of data into cipher while in transit through non-secure parts of systems in order to make it less readily accessible to unauthorized users.

The National Bureau of Standards (NBS) has selected and published a Federal Data Encryption Standard (DES); see Federal Register, Mar. 17, 1975, Vol. 40, No. 52, pp. 12,067–12,250, at 12,134 through 12,139. The announcement states that "Data may be protected against unauthorized disclosure by generating a random key and issuing it to the authorized users of the data. The cipher that has been produced by performing the steps of the encryption algorithm on data using a particular key can only be returned to the original data by use of the decryption algorithm using the identical key. Unauthorized recipients of the cipher who may have the algorithm but who do not have this key cannot derive the original data."

Cryptographic systems are described in U.S. Pat. Nos. 3,796,830 and 3,798,359 which may be employed in the present invention; other known algorithms may also be used.

SUMMARY OF THE INVENTION

It is an object of this invention to provide a new and improved data processing security system.

Another object is to provide a new and improved security system for data processing installations which is especially suitable for commercial use.

In accordance with an embodiment of this invention, a data processing security system comprises a first general-purpose digital computer for processing data signals under the control of stored program signals, said data signals and program signals being in plain-text, said first computer including a digital memory, a central processor, and an input and output means including means for requesting data and programs; a second computer for supplying plain-text data and program signals to said first computer in response to requests therefrom, including means for encrypting and decrypting data and program signals; a signal storage for encrypted information; means for linking said first and second computers for intercommunication and for linking one of said computers and said signal storage; and a hard wall surrounding said second computer to prevent access to the contents thereof under a high degree of security. Thereby, all encrypting processes are maintained under high security and sensitive information is stored in cryptographic form when it is not physically secured within the hard wall.

BRIEF DESCRIPTION OF THE DRAWING

The foregoing and other objects of this invention, the various features thereof as well as the invention itself may be more fully understood from the following description when read together with the accompanying drawing in which.

In the drawing, corresponding parts are referenced throughout by similar numerals.

DETAILED DESCRIPTION OF THE INVENTION

Figure 1:
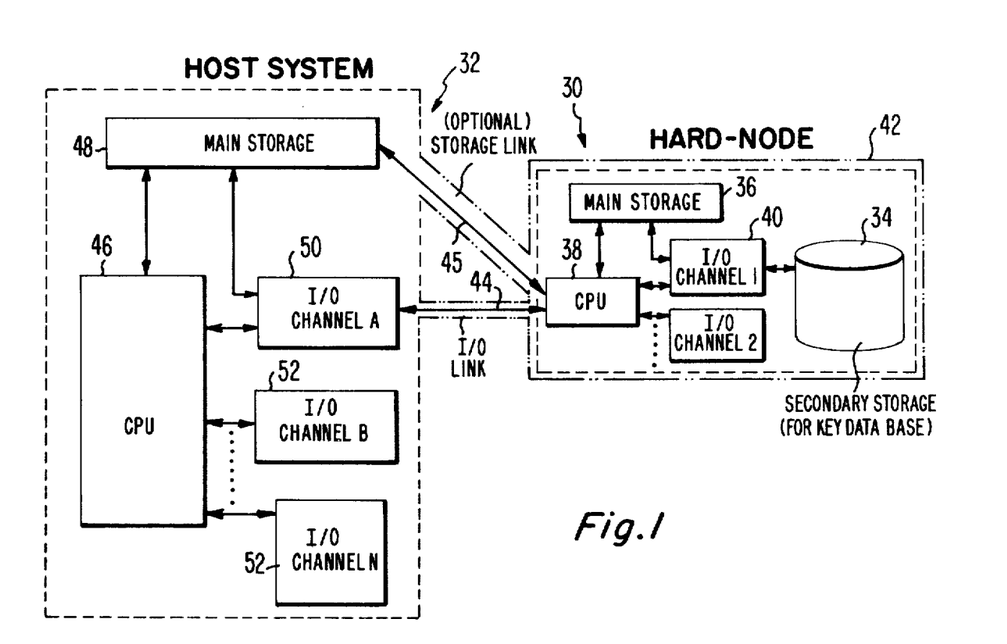
FIG. 1 is a schematic block diagram of a data processing security system embodying this invention.

In the embodiment of FIG. 1, a Hard-Node unit 30 interfaces with the host machine 32 and the key data base storage device 34. Hard-Node is implemented as mini- or micro-computers programmed in RAM, Read-Only Memory (ROM), Programmable Read-Only Memory (PROM), and/or hard-wired circuits or microcode.

The Hard-Node 30 can encrypt/decrypt data passed to it by the host machine 32 and return the results to that machine. This makes it compatible with software or hardware encryption.

The Hard-Node 30 maintains a data base of cryptographic keys for use in encrypting/decrypting data. Only the Hard-Node has access to this data base, so that keys are kept out of the host computer where programmers and operators could observe them. Depending on its size, the data base can be stored on a secondary storage device 34 or in conventional random access memory that serves as the main storage 36 of the central processor 38, each of which can also communicate with the key storage 34 via I/O channel 40. The data base itself should be encrypted under control of a super-key that is stored safely within the Hard-Node. This protects the data base while it is outside the system, as it would be if a copy of the data base were stolen.

Keys are fetched from the data base by the Hard Node in response to requests from the host machine only after the authorization of those requests has been verified. The technique for making this verification and the organization of the data base are variable, dependent on the application. The Hard Node can also perform other services, such as reading and writing encrypted files and generating audit trails of file accesses.

The Hard-Node 30 is stored in a highly secure enclosure 42, such as a locked bank vault, which is not physically accessible except under appropriate conditions to restricted personnel. The hard wall of such an enclosure 42 maintains the security of the encryption process and is also used to enclose the interfaces (I/O communication link 44 and optional main storage link 45) with the host machine 32. The latter includes a processor 46, a main storage 48, an I/O channel 50 that connects the frame to the I/O link 44, and appropriate other I/O channels 52.

Figure 2:
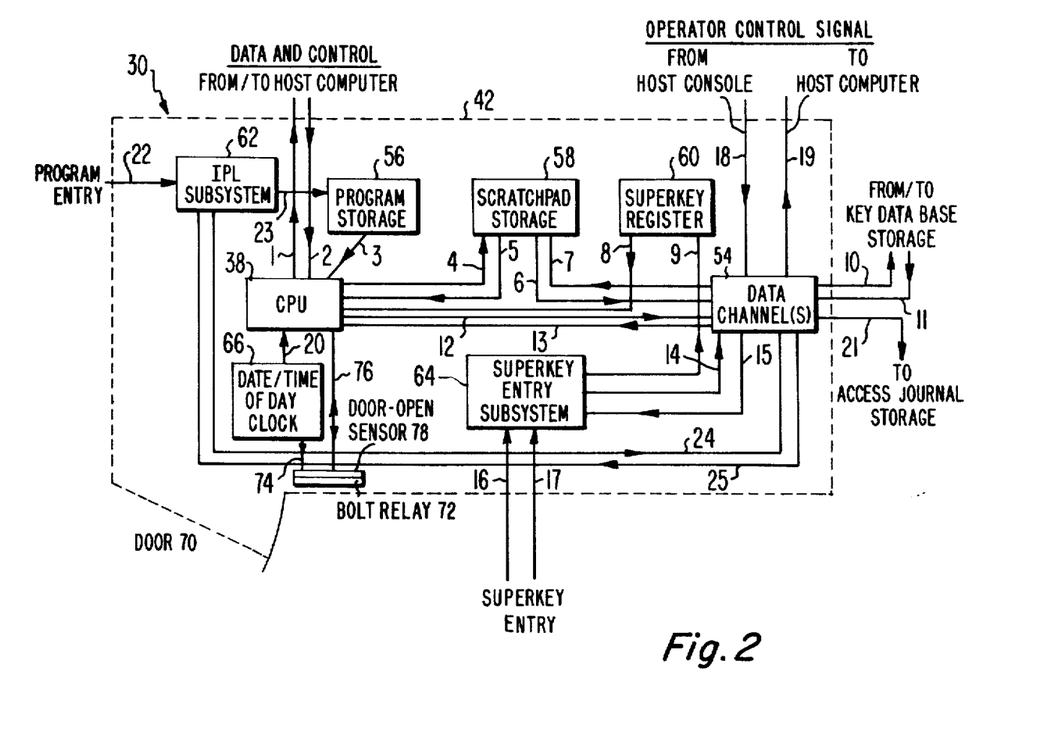
FIG. 2 is a schematic block diagram of a high security portion of the system of FIG. 1.

FIG. 2 shows the basic components of a Hard-Node Unit 30 and their major interconnections. Low-level control lines such as Set Memory Address Register, Clock, and Power-on are not shown. The dotted line represents the secure enclosure 42 which defines the boundary of the Hard-Node to limit unauthorized access to its contents.

The CPU 38 performs most of the work of the Hard-Node. It does the encryption and decryption, authorization checks, communications with the host machine 32, and directs the activities of the data channels 54. The CPU 38 operates under control of a program, stored in Program Storage 56. This is one of the several sections of storage addressable by the CPU, the others being Scratchpad Storage 58 and the Superkey Register 60. Scratchpad Storage 58 is used for buffers, intermediate encryption results and other temporary data. The Superkey Register holds the Hard-Node's own Superkey under which the Key Data Base, at least, is encrypted. For maximum security, it is recommended that the Superkey Register 60 be a volatile storage device with its own battery and interlock to remove all power in case the enclosure 42 is tampered with or opened. The Scratchpad Storage 58 should be a volatile random access memory device, while the Program Storage 56 should be a nonvolatile ROM (read only memory) device. If a volatile RAM device is used for Program Storage, it is recommended that the optional IPL (initial program load) Subsystem 62 be included for reloading and verifying the program in case of accidental erasure; verification basically consists of checking the cryptographic check sum of the program. The Data Channel 54 consists of one or more I/O channels, as required, for communication with the Key Data Base storage device 34 located outside of enclosure 42, the Superkey Entry input device, the Access Journal storage device, and optionally the IPL Subsystem input device and the Host Machine System console Display and Enter function input device. The Superkey Entry Subsystem 64 controls the entry of the Superkey (cryptographic key used by Hard Node in encrypting other keys like those used for sending special identifiers to authorized users) into the Superkey Register 60. It accepts as input one or more numbers (e.g. partial Superkeys received from different persons) and then assembles them by exclusive-ors (XORS) with each other bit by bit, and enters the result into the Register 60. Finally, the Date/Time of Day Clock 66 is a continuously running clock used for recording the correct time of all entries in the Access Journal, including physical access through the enclosure 42 itself via a door (or other entrances) having a bolt time-controlled by the clock.

The lines 1, 2 are the path by which the Hard-Node communicates with the Host Machine 32. They are connected to the Standard Interface 44 and/or the optional Main Storage Link 45. The CPU 38 fetches instructions from Program Storage 56 via line 3, and stores data in Scratchpad Storage 58 via line 4, and retrieves data from that storage via line 5. Data Channels 54 retrieve data from Scratchpad Storage 58 via line 6 and store data there via line 7. CPU 38 accesses the Superkey Register 60 via line 8. Superkey Entry Subsystem 64 enters the Superkey into the Register 60 via line 9. The path by which the Data Channels communicate with the Key Data Base outside of enclosure 42 includes lines 10 and 11. The CPU and Data Channels communicate via the control lines 12 and 13.

The Data Channels input the partial Superkeys via line 14 and store the partial Superkeys into the Superkey Entry Subsystem's storage via line 15. The partial Superkeys are entered via lines 16 and 17. Hard-Node optionally intercepts operator control signals (such as Display and Enter) from the Host Machine System Console via lines 18 and 19. The CPU reads the Date/Time of Day Clock via line 20. The Data Channels communicate with the Access Journal Storage via line 21. The program is optionally entered via line 22 and stored into Program 56 via line 23, and optionally read under control of the Data Channels via lines 24 and 25.

Figure 3:
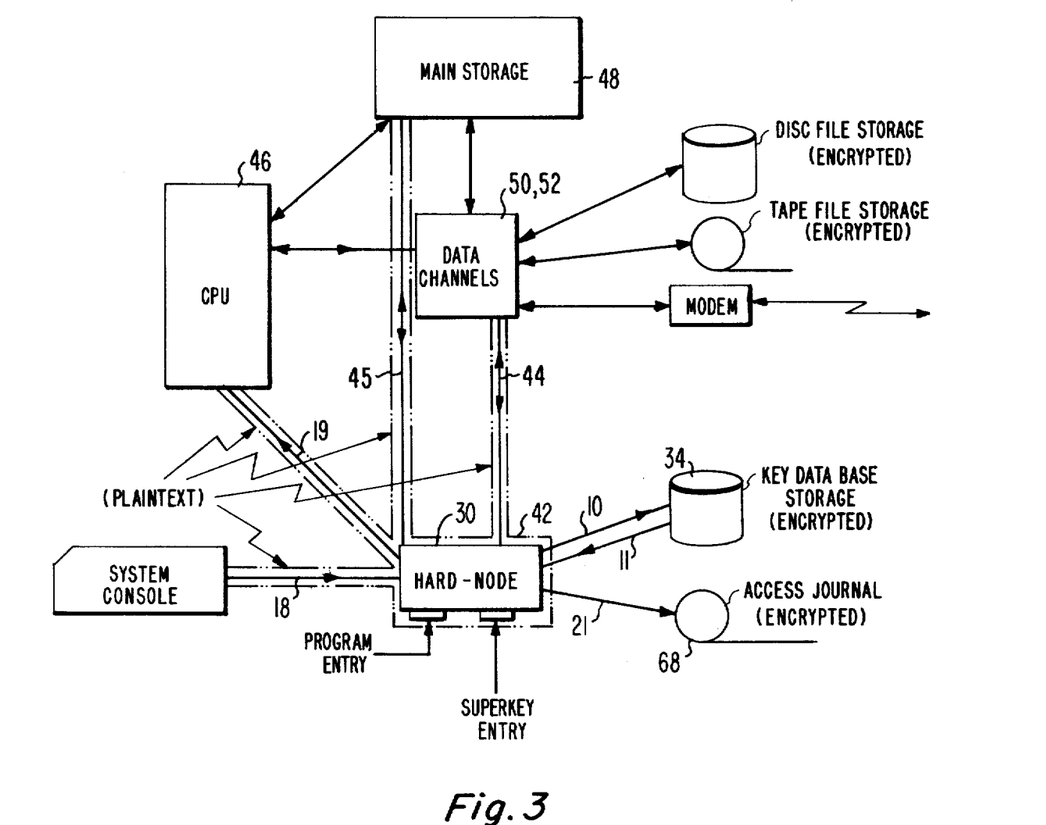
FIG. 3 is a schematic block diagram showing the relationships of the security portion of a modified system embodying this invention to other portions of the data processing system.

The Hard-Node 30 is connected with the components of a Host Machine 32 as shown in FIG. 3. The optional Program Entry device, and the Superkey Entry device, are considered to be part of the Hard-Node, and would generally have their own Hard Skins (security enclosures) protected by separate physical locks. They may be punched card, paper tape, optical disk, magnetic striped card, or other similar kinds of readers. Optionally, corresponding writers may be included for use in generating partial Superkeys. Note that the Key Data Base and Access Journal storage devices 34 and 68 are connected only to the Hard-Node, and not to the Host Machine. Both are encrypted by the Hard-Node, and would be unintelligible to a penetrator who happened to gain physical access to them. The Key Data Base (FIG. 3) is encrypted under the Superkey (unlike FIG. 1 where the Key Data Base is inside the Hard-Node enclosure 42 and therefore does not require encryption), while the Access Journal should probably be encrypted under a different key known to upper management (the Superkey is known to no one) and stored in the Key Data Base, allowing for later offline analysis of the Journal by management. Optionally, the access Journal key may also be protected as the Superkey is, by breaking it up into partial keys which must be XORed to reconstruct the key. Also optionally, the Hard-Node itself may be programmed to perform analysis of the Access Journal. However, this analysis would require the Journal storage tape 68 to be rewound and read, hence unavailable for recording; this could only be done when the Host Machine is not in use. Also, an additional output device (probably a printer) would have to be connected to the Hard-Node for the generated reports, as well as an input device for making report requests.

Lines 18 and 19 are used mainly for the tri-modal operation application. Without the use of this application or similar method of enforced production-program-only mode, the use of ACANs (Access Control Authentication Number) for identifying authorized user requests of the Hard-Node from programs in a multi-programming batch environment is vulnerable to spoofing by other programs after an ACAN has been accepted. Although this cannot be entirely prevented, precautions can be taken by (1) making a detailed record of all accesses in the Access Journal (the level of detail of the Journal is a user option), and (2) using the Main Storage link and keeping track of buffer addresses (which can get complicated if a virtual system is used on the Host Machine); also (3) assuming programs do not modify themselves, a cryptographic check sum of the program can be taken when the ACAN is accepted and verified each time a subsequent request is made (this also requires use of the Main Storage link 45). The Main Storage link 45 is a path by which the Hard-Node's CPU 38 can directly access the Host Machine's Main Storage 48 as if it were part of its own addressable storage. In addition to improving security, it also increases throughput by bypassing Data Channel delay. In any case, the methods used for identifying requestors after an ACAN has been accepted, and whether more than one program can be in communication status with a Hard-Node at the same time, are implementation choices.

Figure 9:
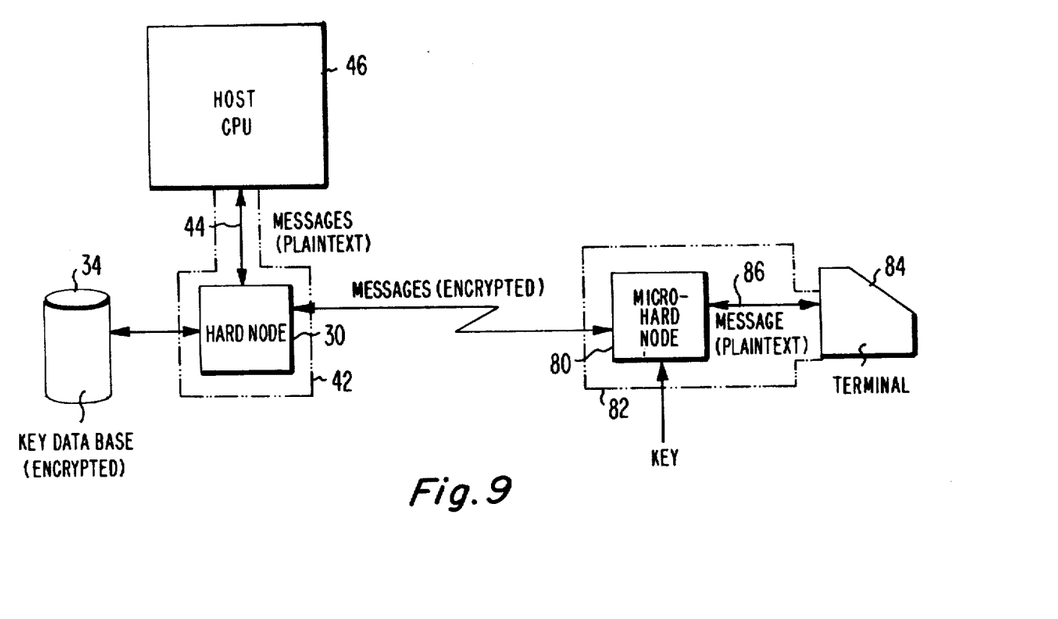
FIGS. 9–12 are schematic block diagrams of modifications of this invention.

For use in protecting communications with remote terminals, each remote terminal should be equipped with a micro-Hard-Node, as shown in FIG. 9. The micro-Hard-Node works in conjunction with the Hard-Node at the Host Machine to protect communications between them. It is more than a link encryptor. It uses Date/Time signals and message-chaining for two-way authentication. At log-on time, it sends an encrypted password to identify the user to the central site Hard-Node, which looks it up in its Key Data Base. The user's key is entered into the micro-Hard-Node's volatile Key Register (analogous to the Hard-Node's Superkey Register) via a Key Entry device, which may be a magnetic stripe reader.

In the system of FIG. 9, the security enclosure 42 of the Hard-Node extends over the Host interface or I/O link 44 to the Host Machine, in order to insure that the I/O link 44 (which carries plain-text messages) is secure. In the link between the Hard-Node 30 and micro-Hard-Node 80, the messages are encrypted since the mode of communication is unprotected. In a similar fashion, the micro-Hard-Node 80 is maintained within a physically secured enclosure 82, which extends up to the terminal 84 and surrounds the communication link 86 to that terminal; because plain-text messages are transmitted over link 86 between the micro-Hard-Node 80 and the terminal 84. This construction of the physical enclosure for the plain-text communication links is similar to that of the systems of FIGS. 1, 3 and 10–12.

Figure 4:
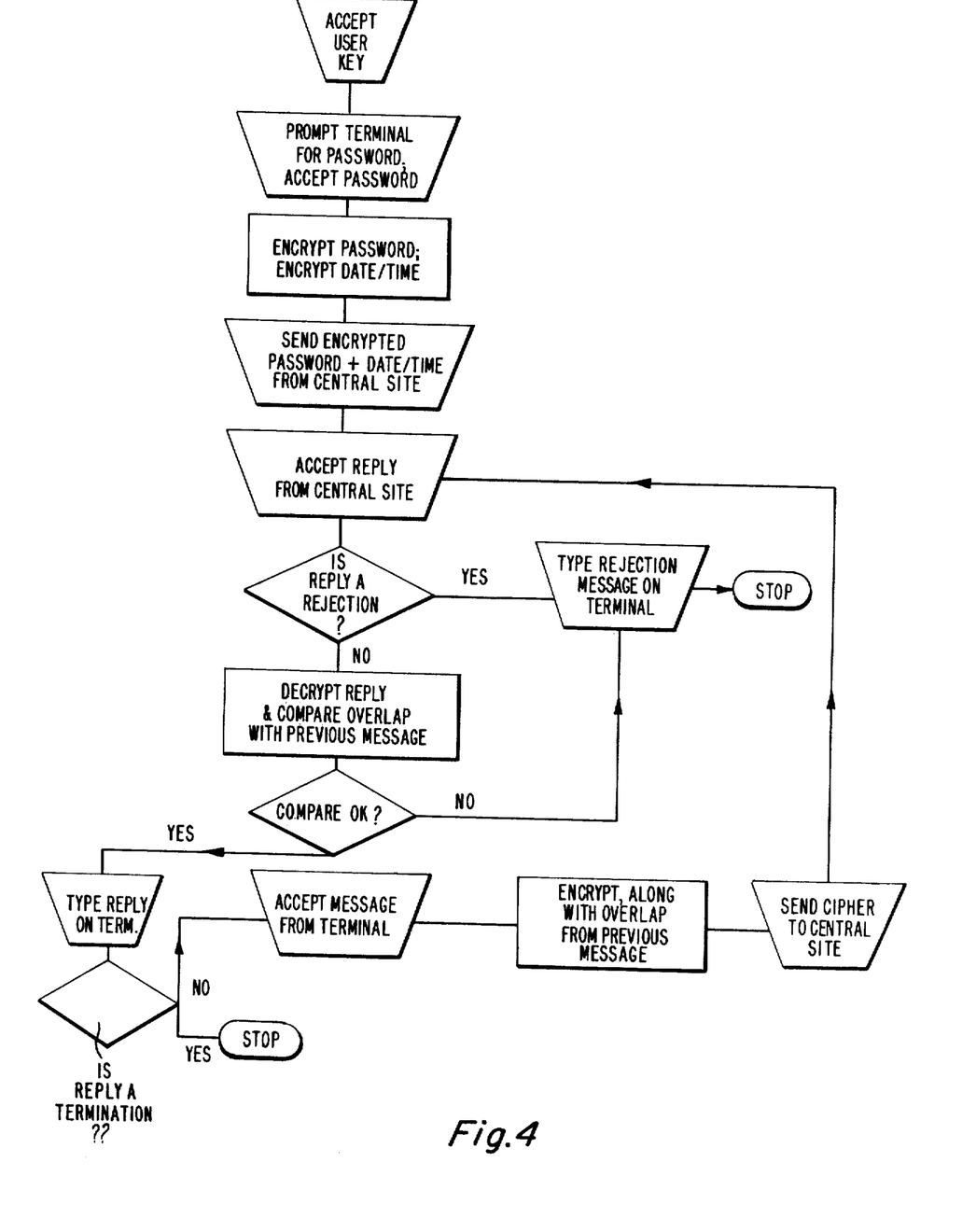
FIGS. 4–8 are schematic block and flow diagrams of control portions of the systems of FIGS. 1, 2, 3, and 9.
Figure 5:
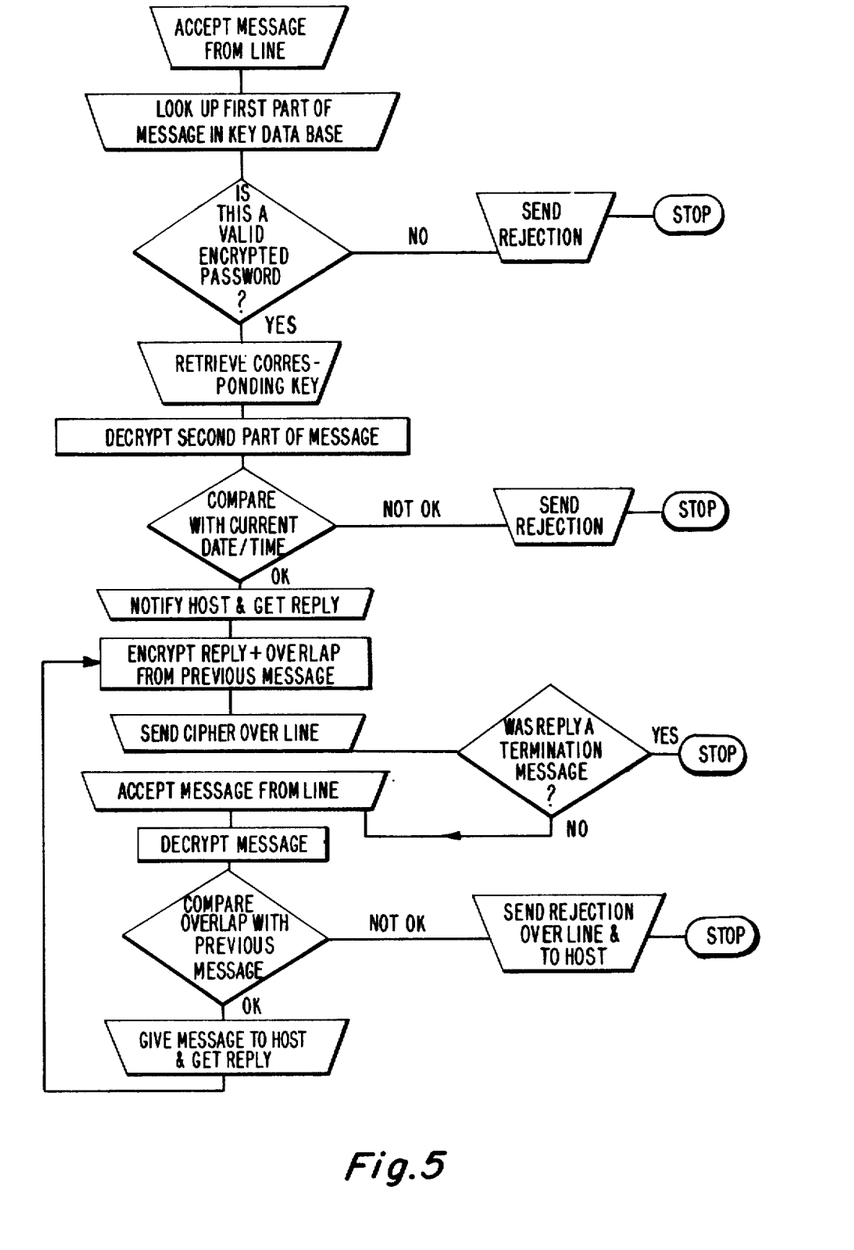
Figure 6:
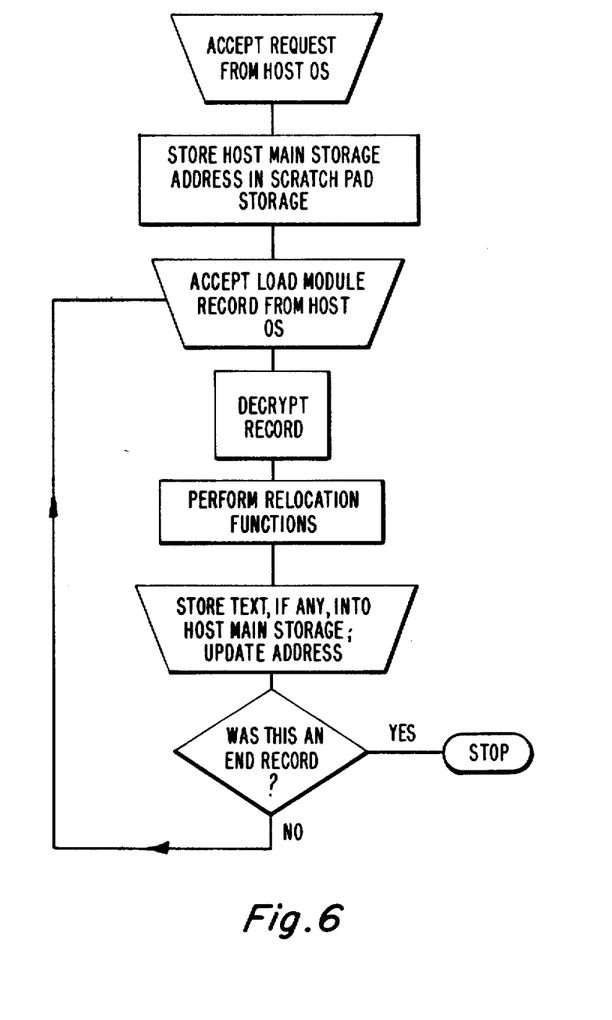
Figure 10:
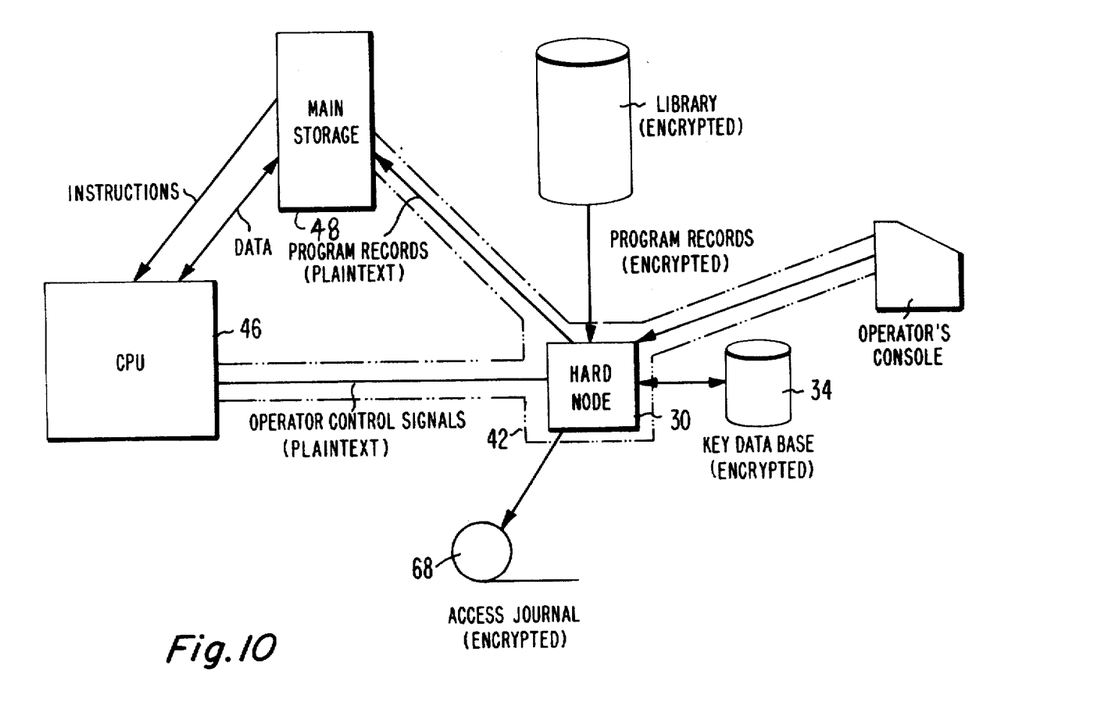

FIG. 4 shows the controls by the micro-Hard-Node 80 of the terminal 84 and FIG. 5 shows the controls by the Hard-Node 30 of the overall system. Not shown in FIG. 5 is the recording of access records in the Access Journal. How often this is done is an implementation choice. The same comment applies to FIGS. 6, and 7 and 8. FIG. 6 shows the action of the Hard-Node in loading a program into the Host Machine during Production Mode in the trimodal operation application. Entry is triggered by a request from the Host's Operating System (OS). Here the Main Storage link is mandatory. In FIG. 6, it is assumed that the function "accept . . . from Host" includes the sending of prompting and ready messages to the Host. To perform this loading function, it may be necessary for the Hard-Node to have access to some intermediate secondary storage, in addition to its Scratchpad Storage. FIG. 10 shows the Host-Hard-Node system in which there is information and control flow in the production-only mode of the tri-modal application. The other two modes are the development mode, in which a system operates without security controls as in a conventional present-day system, and the installation mode, in which certified documented programs are compiled by previously certified compilers and other system programs, and are encrypted by the Hard-Node for storage in unprotected file storage.

Figure 7:
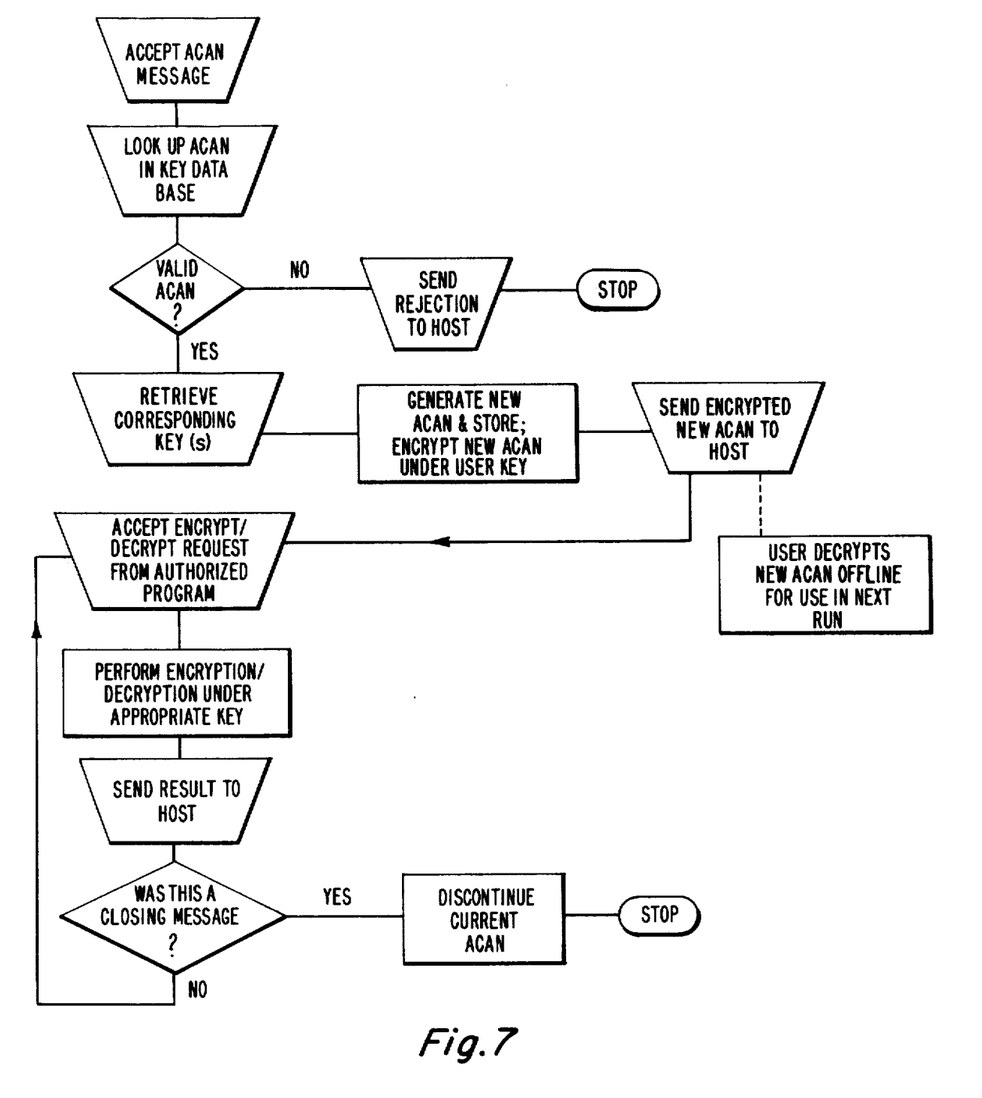
Figure 11:
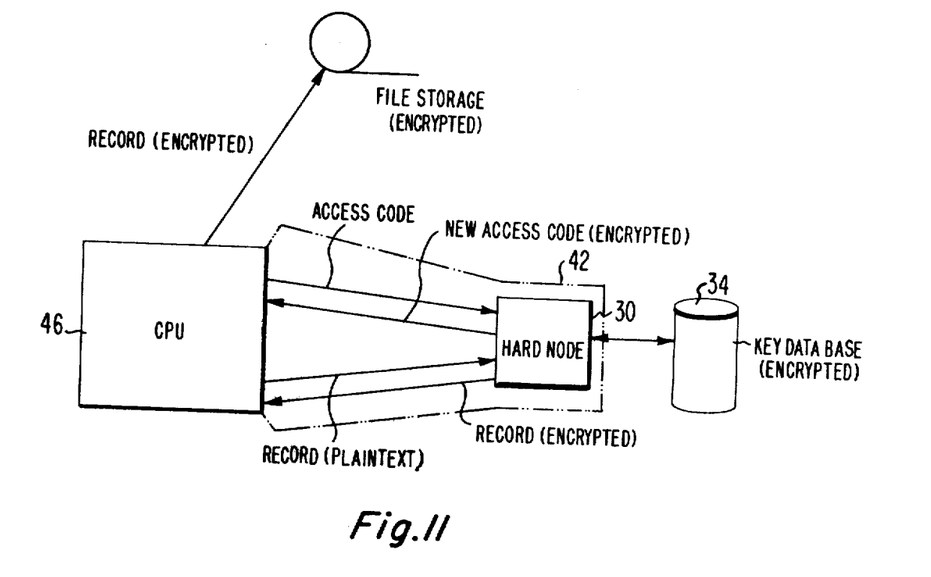
Figure 12:
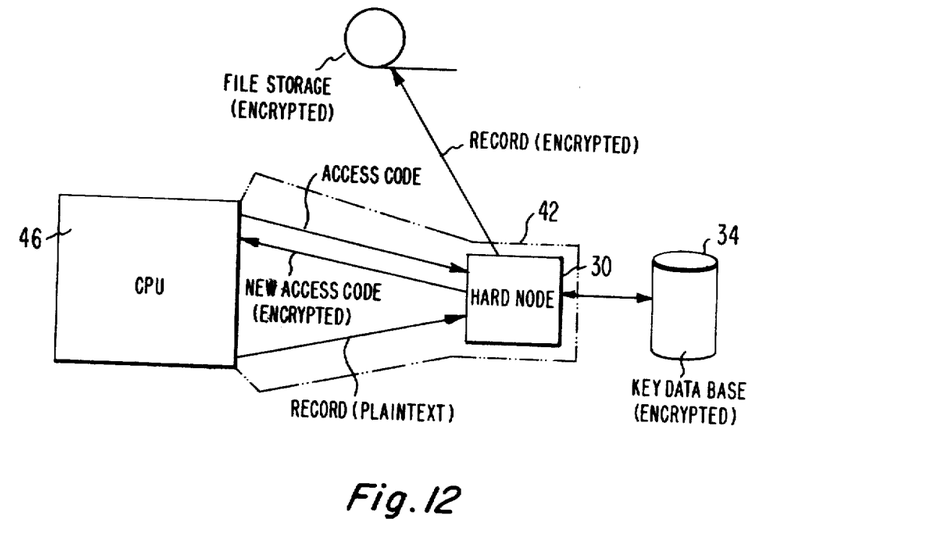

FIGS. 11 and 12 describe the operation of the ACAN with encrypted files accessed respectively by the Host System and the Hard-Node. FIG. 7 shows the controls for acceptance of an ACAN from a Host program.

The Access Journal storage 68 (FIG. 3) is of any suitable form, such as disk storage, that receives messages from the Hard-Node CPU 38 identifying all communications to and from the Hard-Node. The Hard-Node CPU provides an output in an encryption or decryption operation and provides a record of the time, date, the requesting persons', terminals' or CPUs' keys that access the Hard-Node, and the data files and programs requested and the services performed by the Hard-Node. The Journal storage receives these access messages in an encrypted form from the Hard-Node and may be physically located immediately outside of the Hard-Node enclosure 42 or close by. The Access Journal is processed off-line by suitable manager personnel. In addition, the Access Journal receives messages of all physical entries into the secure enclosure 42 surrounding the Hard-Node 30 via a door 70 (FIG. 2) in that enclosure. The door, like a bank vault, has a bolt relay 72 which is actuated at appropriate times under the control of signals from the clock 66 via line 74. That is, when the bolt relay is actuated during limited and controlled time periods, the door 70 may be opened by appropriate personnel. In addition, a sensor 78 (or a plurality thereof) detects when the door is open and closed and any other relevant conditions of the door, and supplies appropriate representative signals to the CPU 38, which identifies the times when physical access into the Hard-Node is achieved. Messages are formed of this information and recorded on the Access Journal.

Figure 8:
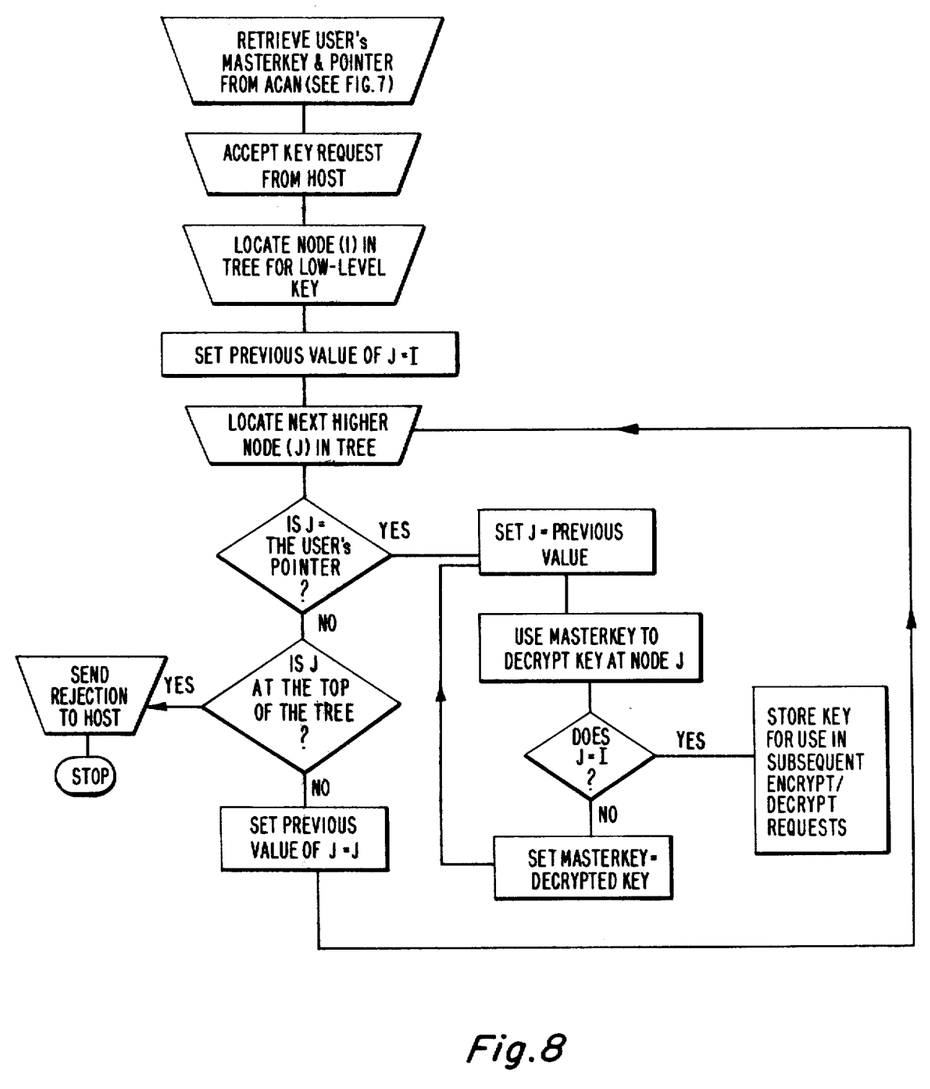

FIG. 8 shows the use of Hard-Node processing to locate the correct key when using a Masterkey Tree (an array of keys such that items below and connected to a particular key are accessible by that key). The tree is stored in part of the Key Data Base. In this flow chart of FIG. 8 as in the preceding ones, all accesses to the Key Data Base involve encryption/decryption under the Superkey. In FIG. 8, all values of the node pointer J (or possibly even the corresponding records), starting at I and ending (if successful) at the user's pointer, are stored, in order, in Scratchpad Storage. The list is used as a pushdown stack to successively decrypt the keys along the chain until the desired key is reached. Note that in this scheme the user does not present his plain-text masterkey and corresponding pointer, but instead these data are retrieved from the Key Data Base employing the user's ACAN. Thus no keys need ever appear in the Host Machine.

It is seen that a new and improved security system for data processing is provided by this invention. The security system protects sensitive information without disruption of the normal operation of a computer center and is particularly suitable for commercial applications.

What is claimed is:

1. A data processing security system comprising:
 a first general-purpose digital computer for processing data signals under the control of stored program signals, with information signals including said data signals and program signals being in plain-text, said first computer including a digital memory, a central processor, and an input and output means including means for requesting data and programs, and means for housing said first computer to be accessible to ordinary operating personnel;

a second cryption computer for transferring plaintext information signals to and from said first computer in response to requests from said first computer, including means for encrypting and decrypting information signals to transform said information signals between plaintext and encrypted forms;

means, including a storage for a key date base operationally usable during production by way of said cryption computer, for providing keys for operating said encrypting and decrypting means to transform said information signals between plaintext and encrypted forms;

said encrypting and decrypting means, including means having controls for entry of other cryptographic keys for encrypting and decrypting the keys of said key data base a signal storage for encrypted information signals housed to be accessible to ordinary operating personnel;

means for transferring information signals between said first computer and said signal storage, said transferring means including said cryption computer, first means for linking said first and second computers for plaintext intercommunication, and second means for linking said second computer and said signal storage for transferring encrypted information signals therebetween;

and means, including a hard wall housing surrounding said cryption computer, for preventing access to the contents thereof under a high degree of security, and for maintaining said cryption computer closed to access by the ordinary operating personnel of said first computer;

whereby a high security encryption process is maintained within said hard wall, and is inaccessible for tampering, and said first computer and signal storage operate respectively to process information signals in plaintext and store encrypted signals without special limitation on access thereto.

2. A data processing security system as recited in claim 1, wherein said signal storage stores encrypted data processed by said first computer in plaintext form.

3. A data processing security system as recited in claim 1, wherein said signal storage stores encrypted programs to be used in plaintext form in said first computer.

4. A data processing security system as recited in claim 1 wherein said cryption computer further includes means for recording an access-journal of all accesses by said first computer to said cryption computer.

5. A data processing security system as recited in claim 4 and further comprising a continuously running clock in said hard wall and associated with said cryption computer for recording the time of all entries in said access-journal.

6. A data processing system as recited in claim 5, wherein said cryption computer includes means for authenticating users of said first computer requesting access to said signal storage.

7. A data processing security system as recited in claim 6 wherein said authenticating means in said cryption computer includes means for supplying encrypted authentication identifiers to said first computer and for comparing decrypted identifiers returned from said first computer with the previously supplied identifiers to authenticate access.

8. A data processing security system as recited in claim 1 wherein said key data base storage is outside of said hard wall housing and said keys are in encrypted form.

9. A data processing security system as recited in claim 1 wherein said key data base storage is inside said hard wall housing.

10. A data processing security system as recited in claim 1 wherein said controls for entry of other cryptographic keys include means for accepting partial cryptographic keys as inputs and for assembling said other cryptographic keys from said partial keys, whereby the complete assembly of said other keys can be restricted to said cryption computer.

11. A data processing security system as recited in claim 1 wherein said encrypting and decrypting means includes means to perform a cryptographic check on the digits of said information signals to detect unauthorized changes in the information content thereof.

12. A data processing security system as recited in claim 1 and further comprising at least one remote terminal having a cryption computer in a hard wall housing, and means providing a telecommunication link between said cryption computers for encrypted messages.

* * * * *